United States Patent [19]
>
> Leoncavallo

[11] Patent Number: 4,678,576

[45] Date of Patent: Jul. 7, 1987

[54] REUSABLE FILTER UNIT WITH RECOVERABLE FILTER MEMBRANE

[75] Inventor: Richard A. Leoncavallo, Pittsford, N.Y.

[73] Assignee: Nalge Company, Rochester, N.Y.

[21] Appl. No.: 715,853

[22] Filed: Jun. 7, 1985

Related U.S. Application Data

[63] Continuation of Ser. No. 505,609, Jun. 20, 1983, abandoned, which is a continuation of Ser. No. 302,823, Sep. 16, 1981, abandoned.

[51] Int. Cl.$^4$ .............................................. B01D 13/00
[52] U.S. Cl. .................. 210/433.2; 210/445; 210/450; 210/451; 210/453
[58] Field of Search ...................... 210/232, 433.2, 445, 210/446, 447, 450, 451, 453; 505/609

[56] References Cited

U.S. PATENT DOCUMENTS

| | | | |
|---|---|---|---|
| 1,411,972 | 4/1922 | Madden. | |
| 2,775,350 | 12/1956 | Jones | 210/446 |
| 3,085,689 | 4/1963 | Hering et al. | 210/232 |
| 3,295,686 | 1/1967 | Krueger | 210/455 |
| 3,360,128 | 12/1967 | Federline | 210/446 |
| 3,361,261 | 1/1968 | Fairey et al. | 210/445 |
| 3,929,648 | 12/1975 | Cuthbert | 210/453 X |
| 4,055,498 | 10/1977 | Radnoti | 210/446 X |

FOREIGN PATENT DOCUMENTS

| | | |
|---|---|---|
| 1090005 | 9/1960 | Fed. Rep. of Germany. |
| 2753864 | 6/1979 | Fed. Rep. of Germany. |
| 2825441 | 12/1979 | Fed. Rep. of Germany. |
| 2848404 | 5/1980 | Fed. Rep. of Germany. |

Primary Examiner—David Sadowski
Attorney, Agent, or Firm—Frank Pincelli

[57] ABSTRACT

A reusable laboratory filter unit having a recoverable filter member. The unit has an upper body or reservoir for receiving the liquid to be filtered and a lower body or receptacle for receiving filtrate. A plate for supporting the filter membrane is captured between the upper and lower bodies when the bodies are joined together. A threaded ring arrangement draws the bodies together axially without rotating one with respect to the other so the membrane is not subjected to any twisting force. Separation of the bodies exposes the support plate so it can be easily removed to recover the membrane.

10 Claims, 3 Drawing Figures

REUSABLE FILTER UNIT WITH RECOVERABLE FILTER MEMBRANE

This is a continuation of application Ser. No. 505,609 filed June 20, 1983, now abandoned, which is a continuation of application Ser. No. 302,823 filed on Sept. 16, 1981, now abandoned.

BACKGROUND OF THE INVENTION

The present invention relates to filtration units for laboratory use and more particularly to a reusable filtration unit having a recoverable filter membrane.

A variety of reusable filter units as known in the art are used in various laboratory applications wherein a sample of a liquid is filtered through a filter membrane. The filter membrane is then recovered so that the material collected on the membrane can be inspected or cultured.

Briefly, such reusable units usually include an upper body for receiving the liquid to be filtered, a lower body for receiving the filtrate, an intermediate member for supporting the filter membrane and a means for locking the three components together and effecting an air tight seal about the filter membrane.

Filtration units of the prior art employ various means to releasably assemble and lock the upper and lower bodies together. For example, in one version, the two bodies are threaded so that one may be screwed into the other. Bayonet locks are also employed and still another version has the mating ends of the upper and lower bodies provided with magnets for holding them together.

In the bayonet and threaded attachments (and to some extent in the magnetic attachment), one of the bodies must be rotated or twisted with respect to the other in order to assemble or disassemble the filter unit. Such an arrangement is not entirely satisfactory as relative rotation of one or another of the bodies during assembly or disassembly may twist, bend or even tear the filter membrane. Damage to the membrane during assembly of the filter unit could result in poor filtration. Damage resulting during disassembly to remove the membrane could result in loss of some portion of the material filtered from the liquid. For these reasons, it is important and preferred that the upper and lower body members be assembled in a manner which avoids application of a shearing or twisting force to the filter membrane and that the filter membrane be inserted and recovered in as flat a condition as possible.

Another disadvantage of the prior art filter units is that the filter membrane is not easily removed from its support plate, particularly when the membrane has been pressed against this plate as during vacuum filtration. For example, in some prior art units the membrane support plate is fixed to the lower body and no provision is made for inserting a tool between the membrane and support plate to facilitate peeling the membrane from the plate. In other prior art units the support plate is removably located in a recess in either the upper or lower body which makes it difficult to separate the filter support plate from the surrounding structure.

SUMMARY OF THE PRESENT INVENTION

In the present invention, the upper and lower body members of the filter unit are drawn axially together without rotating one member with respect to the other. Connecting the upper and lower body members together clamps the support plate for the filter membrane between the two members. In the preferred embodiment, the support plate rests on a collar and has an outside diameter which is larger than the collar so that when the filter unit is disassembled, the support plate can be picked manually from the collar for inspection or removal of the filter membrane. Provision is also made for inserting a tool beneath the filter membrane to facilitate removal from the support plate.

DESCRIPTION OF THE PREFERRED EMBODIMENT

Figure 1:
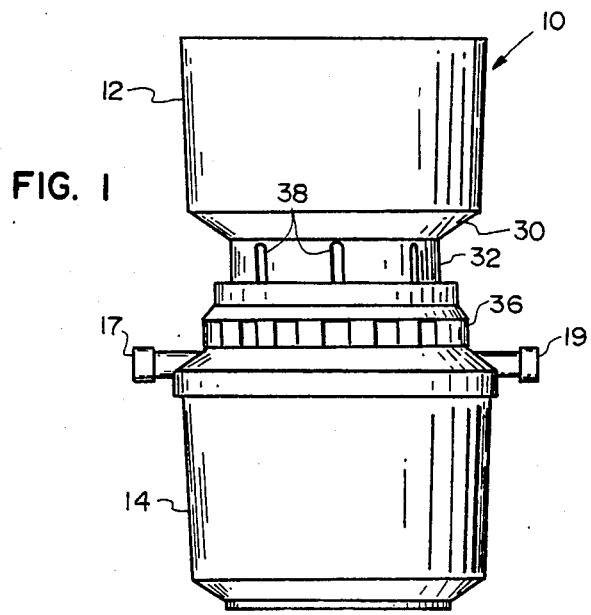
FIG. 1 is an elevation view showing the filter unit of the present invention.

Referring to the drawings, FIG. 1 shows the reusable filter unit 10 of the present invention as including a reservoir or upper body 12 for receiving a quantity of the liquid to be filtered releasably joined to a receptacle or lower body 14 for receiving the filtrate. For convenience, both the upper and lower bodies are cylindrical and are made of an autoclavable and preferably transparent material such as plycarbonate or polysulfone. Filter units as are common in the art may range in size up to 500 mL including a filter membrane diameter of up to 50 mL.

It is also common to employ vacuum to aid in drawing the liquid through the filter membrane and for this purpose, lower body 14 is provided with a port 17 for connection to a vacuum line (not shown).

Figure 2:
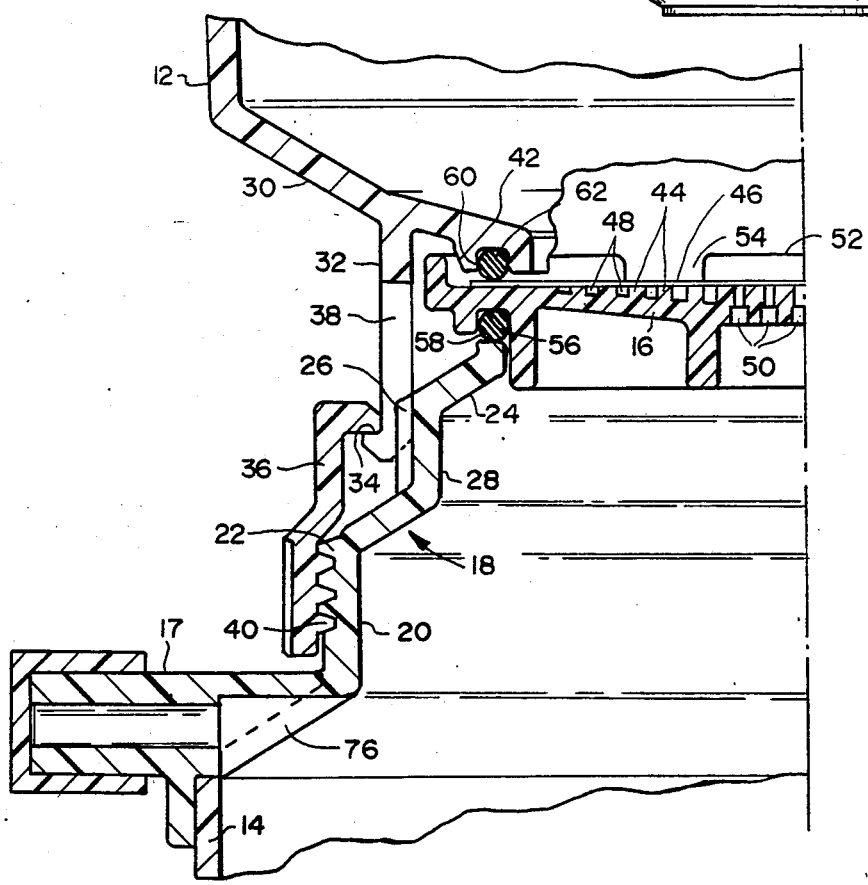
FIG. 2 is side elevation view on an enlarged scale, partly broken away and in section showing a portion of the filter unit shown in FIG. 1.

According to FIG. 2, the lower body has an annular collar generally indicated at 18. The lower portion 20 of this collar has the largest diameter and is provided with external threads 22. The uppermost portion 24 of the collar has the smallest diameter and releasably carries a filter membrane support plate 16. This plate is further described hereinbelow.

The intermediate portion 28 of the collar has an outside diameter of a size which is between the diameters of the lower and upper portions 20, 24 respectively.

Upper body 12 has a necked portion 30. Depending from this necked portion is a split flange 32. The lower end of the split flange has an external shoulder 34 which captures a locking ring 36 having internal threads 40. Axial slots 38 provided about the split flange permit a contraction of the diameter of the flange so that locking ring 36 may be pushed over shoulder 34. When the flange is allowed to expand back to its original configuration, shoulder 34 captures the locking ring 36 as shown in FIG. 2.

With this arrangement, the locking ring 36 can rotate with respect to split flange 32 so that when the locking ring is threaded to the lower portion of 20 of collar 18, the upper and lower bodies 12, 14 respectively will be drawn axially together without one rotating with respect to the other.

If desired, axial ribs 26 can be moded onto the intermediate portion 28 so as to align with axial slots 38. The engagement of such ribs into the slots would insure that no twisting of the upper and lower bodies occurs as they are drawn together.

Formed integral the necked portion 30, is an internal shoulder 42 which acts to clamp the support plate 16 against the upper collar portion 24 when the upper and lower bodies are drawn axially together.

Support plate 16 has its upper surface provided with a plurality of upstanding projections 44. These projections are spaced close together and provide support to a filter membrane 46 resting on and extending over the support plate. The spaces 48 between the projections communicate with one another for channeling liquid passing through the filter membrane to the central portion of the support plate. This central portion is provided with through openings 50 to permit the filtrate to fall into the lower body or receptacle 14.

Disposed about the outer periphery of support plate 26 is an upstanding wall 52. This wall increases the overall thickness of the support plate to facilitate manual grasping and lifting of the support plate from collar 18. Because this wall 52 surrounds the filter membrane, it is provided with several spaced openings 54 to facilitate removal of the filter membrane from the support plate. In this respect the openings permit a user to insert a tweezer or other appropriate device into one of the spaces 48 beneath the filter membrane for lifting the membrane from the support plate.

The under surface of support plate 16 is provided with an annular groove 56 for receiving an O-ring or other appropriate gasket 58. This gasket provides a seal between the support plate 16 and the upper edge of collar portion 24.

Completing the structure of the filter unit, FIG. 2 shows that internal shoulder 42 also is provided with an annular groove 60 for receiving an O-ring or other appropriate gasket 62. The gasket seats against the upper surface of support plate 16 to provide an air tight seal between the plate and the upper body 12.

In use, a filter membrane 46 is placed on support plate 16. The plate and its gasket 58 is then rested on the upper edge of collar portion 24. To assemble the unit, upper body 12 is simply placed on top of collar 18 and the locking ring 36 threaded to the lower collar portion 20. Tightening the locking ring draws the upper body portion axially toward the lower body portion so the internal shoulder 42 and its gasket 62 are pressed against the filter membrane and the support plate for clamping the support plate to the upper edge of collar portion 24. Since the upper body is not rotated with respect to the filter membrane, the joining of the two body portions does not result in bending, folding, twisting or tearing of the membrane. Also, as the upper body portion is tightened down against the lower body portion, the intermediate collar portion 28 extends into the split flange and engages the inside surface of the flange. This engagement acts to provide a radial bearing support to prevent the inward deflection of the split flange and possible separation of the locking ring from shoulder 34 as the locking ring is tightened.

The liquid to be filtered is then placed into the upper body portron 12 and a vacuum line attached to port 17 for evacuating the lower body protion. The seals effected by gaskets 58 and 62 insure that only liquid from the upper body portion is drawn through the filter membrane and that no air enters into the lower body portion around internal shoulder 42 or over the collar 18.

When filtration is complete, the locking ring is unthreaded and the body portion is lifted from collar 18. This exposes the entire outer periphery of the support plate so that it can be manually grasped and removed. The material filtered from the liquid can then be examined or, if desired, the membrane can be removed as described hereinabove for a microscopic examination or culturing of the material filtered from the liquid.

Should the user desire to recover only the filtrate collected in the lower body 14, this can be done without disassembly simply by pouring the filtrate out through port 17. A second port 19 (FIG. 1) formed on the other side of the lower body acts as an air vent to allow quick discharge of the filtrate. In addition, the wall of the lower body portion can be provided with a recess as shown at 76 to facilitate recovery of the filtrate by channeling the filtrate to port 17.

Figure 3:
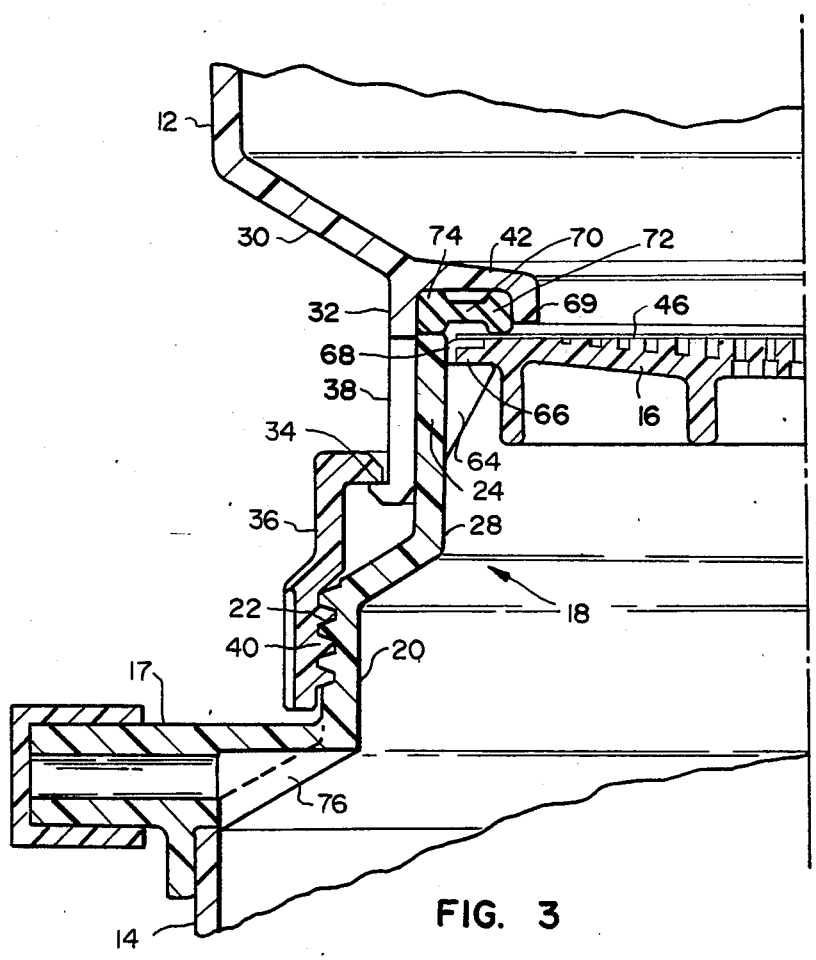
FIG. 3 is a view similar to FIG. 1 showing another embodiment of the invention.

Referring now to FIG. 3, another embodiment of the invention is shown wherein many of the components of the filter unit are similar to those shown in FIG. 2. Accordingly, the same reference numeral has been used where the part referred to is the same as that shown in FIG. 2.

In the FIG. 1 embodiment, as in FIG. 2, the lower body 14 has an upstanding collar generally indicated at 18 but, in this embodiment, the upper and intermediate portions 24 and 28 of the collar have the same outside diameter. Accordingly, there is supporting contact for split flange 32 over a greater portion of the length of the split flange as opposed to the FIG. 2 embodiment. Thus, the construction of the FIG. 3 embodiment provides greater radial support for the split flange than does the embodiment shown in FIG. 2.

Formed about the inside diameter of collar portion 24 are a plurality of support ribs 64 for receiving the support plate 16. In this respect, the outside diameter of the plate, in this embodiment, is less than the inside diameter of the collar so the plate is supported within the collar on ribs 64.

Also, in the FIG. 2 embodiment, the upper surface of plate 16 is recessed at its outer edge so that the filter membrane 46 resting on plate 26 overhangs the upper surface as shown at 68. When the support plate 16 is removed from the filter unit, this construction allows the operator to insert one prong of the tweezers or other suitable device beneath the edge of the filter membrane in order to easily lift the membrane from the support plate.

In order to effect a seal between the support plate 16, the upper collar portion 24 and split flange 32, the internal shoulder 42 of the upper body extends inward from the flange and has a downward turned lip 69. The space between this lip and the flange provides a seat for a generally H-shaped gasket member 70. With a gasket in this form, one leg 72 of the gasket seals between the flange and plate 16 while the other leg 74 of the H-shaped gasket seals between shoulder 32 and the upper edge of collar portion 24.

While the embodiment shown in FIG. 3 does provide an alternative to that shown in FIG. 2, it is not preferred because the recessed portion of support plate 16 makes it more difficult to remove the plate from collar 18. In the FIG. 2 embodiment, however, the support plate 26 merely rests on the upper edge of collar portion 24 which makes it very easy to simply grasp and lift the support plate from the collar.

To facilitate manufacture, the collar 18 and lower body 14 can be made separately as by injection molding wherein port 17 is made integral collar 18 as shown in the drawings. The lower body portion 14 can then be attached to the collar by any suitable joining techniques such as sonic welding to form an integral unit. In this way the lower body portion can be made in several configurations or sizes and then joined to a standard collar portion.

In any event, it should be appreciated that the present invention does provide a reusable filter until that greatly facilitates recovery of the filter membrane. The present invention also reduces damage to the membrane when assemblying the unit for use or when disassemblying the unit to recover the membrane.

Having thus described the invention in detail, what is claimed as new is:

1. A reusable filter unit, comprising a lower body forming a receptacle for receiving a filtrate and having an upstanding collar terminating in a circular rim portion defining an open top of the lower body, an upper body forming a reservoir for receiving liquid to be filtered and having an inwardly extending internal shoulder defining a lower outlet of the upper body and a dependent cylindrical flange disposed outwardly of and around said internal shoulder terminating in a lower end, said flange having an inside surface, a perforated support plate supported between the upper and lower bodies upon said circular rim portion having an upper surface for supporting a filter membrane thereon, characterized in that the cylindrical flange has a retaining shoulder which extends radially outwardly of the lower end of the flange, said upstanding collar having external threads and also an intermediate portion which extends into the flange so as to engage the inside surface of said flange as said lower and upper bodies are pulled axially together, and a rotatable locking ring having internal threads is retained on the flange by the retaining shoulder and is engagable with the external threads on the collar so as to draw the upper body into contact with the support plate and with the lower body in releasable clamping engagement without relative rotation of the upper and lower bodies.

2. A reusable filter apparatus according to claim 1 further comprising sealing means between said lower body and said perforated support plate, and between said perforated support plate and said upper body, to form liquid tight connections when said upper and lower bodies are drawn together.

3. A filter unit according to claim 1, wherein said support plate has a diameter greater than that of said collar and an outer periphery which overhangs said collar.

4. A filter unit according to claim 3, wherein said support plate has a peripheral wall in which spaced openings are provided for allowing access to the upper surface of said support plate beneath the filter membrane when placed thereon.

5. A filter unit according to claim 4, wherein said internal shoulder includes a first groove holding a gasket so as to bear against the upper surface of said support plate.

6. A filter unit according to claim 3, wherein said internal shoulder includes a first groove holding a gasket so as to bear against the upper surface of said support plate.

7. A filter unit according to claim 6, wherein said support plate has a lower surface which includes a second groove having a diameter substantially equal to that of said collar and a gasket is located in said second groove so as to seat against the collar.

8. A filter unit according to claim 1, wherein said collar has an inside diameter, said support plate having an outside diameter smaller than the inside diameter of said collar and periphery, said collar having at least one internal rib for engaging the periphery of said support plate for supporting said support plate in position within said collar; the upper surface of said support plate having a recess portion extending about its pheriphery to allow a filter membrane disposed on the upper surface to overhang said upper surface.

9. A filter unit according to claim 8, wherein said internal shoulder extends inwardly from said flange and has a down-turned portion defining said lower outlet, said flange and the down-turned shoulder portion defining a space which contains a gasket extending across the recessed portion of said support plate, said gasket having a first portion and a second portion, said first portion of said gasket bearing against said collar and said second portion said gasket bearing against the upper surface of said support plate.

10. A filter unit according to claims 1, 3 or 4 wherein said flange defines an axial slot, said collar having an outer surface, said outer surface having an axial rib which extends into a corresponding axial slot in said flange so as to prevent relative, rotation of said upper and lower bodies as they are drawn together.

* * * * *